Patented Oct. 10, 1933

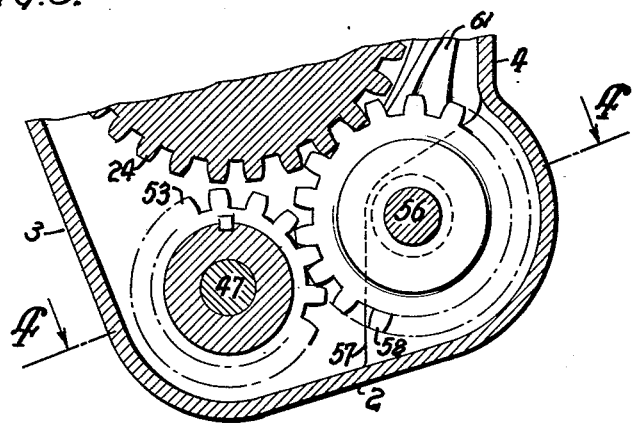
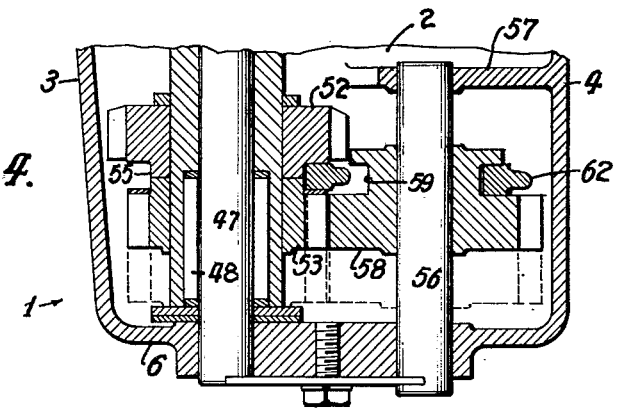

1,930,072

UNITED STATES PATENT OFFICE 1,930,072

AUTOMOTIVE TRANSMISSION

Clarence H. Barton, Indianapolis, Ind., assignor to L. G. S. Devices Corporation, Indianapolis, Ind., a corporation of Indiana Application August 14, 1931. Serial No. 556,964

14 Claims. (Cl. 74—57)

This invention relates to improvements in automotive transmissions and it consists of the matters hereinafter described and more particularly pointed out in the appended claims.

The primary object of the invention is to provide an automotive transmission providing a plurality of forward speeds and reverse and which includes means providing free wheeling in all forward speeds without the necessity of separate means providing lock-out of said free wheeling for reverse, there also being means provided whereby the free wheeling may be locked-out in all forward speeds, so that the transmission can be employed as a non-free wheeling or conventional one when so desired.

A further object of the invention is to provide a transmission of this kind, which is simple in construction, is easy for operation especially for the novice driver and which has the parts thereof so disposed, that the transmission comes well within the space available in the modern automobile.

These objects of the invention as well as others, together with the many advantages thereof, will more fully appear as I proceed with my specification.

In the drawings:—

Fig. 3 is a transverse vertical detail sectional view on an enlarged scale as taken on the line 3—3 of Fig. 1.

Fig. 4 is a horizontal detail sectional view through a part of the transmission as taken on the line 4—4 of Fig. 3.

Figure 1:
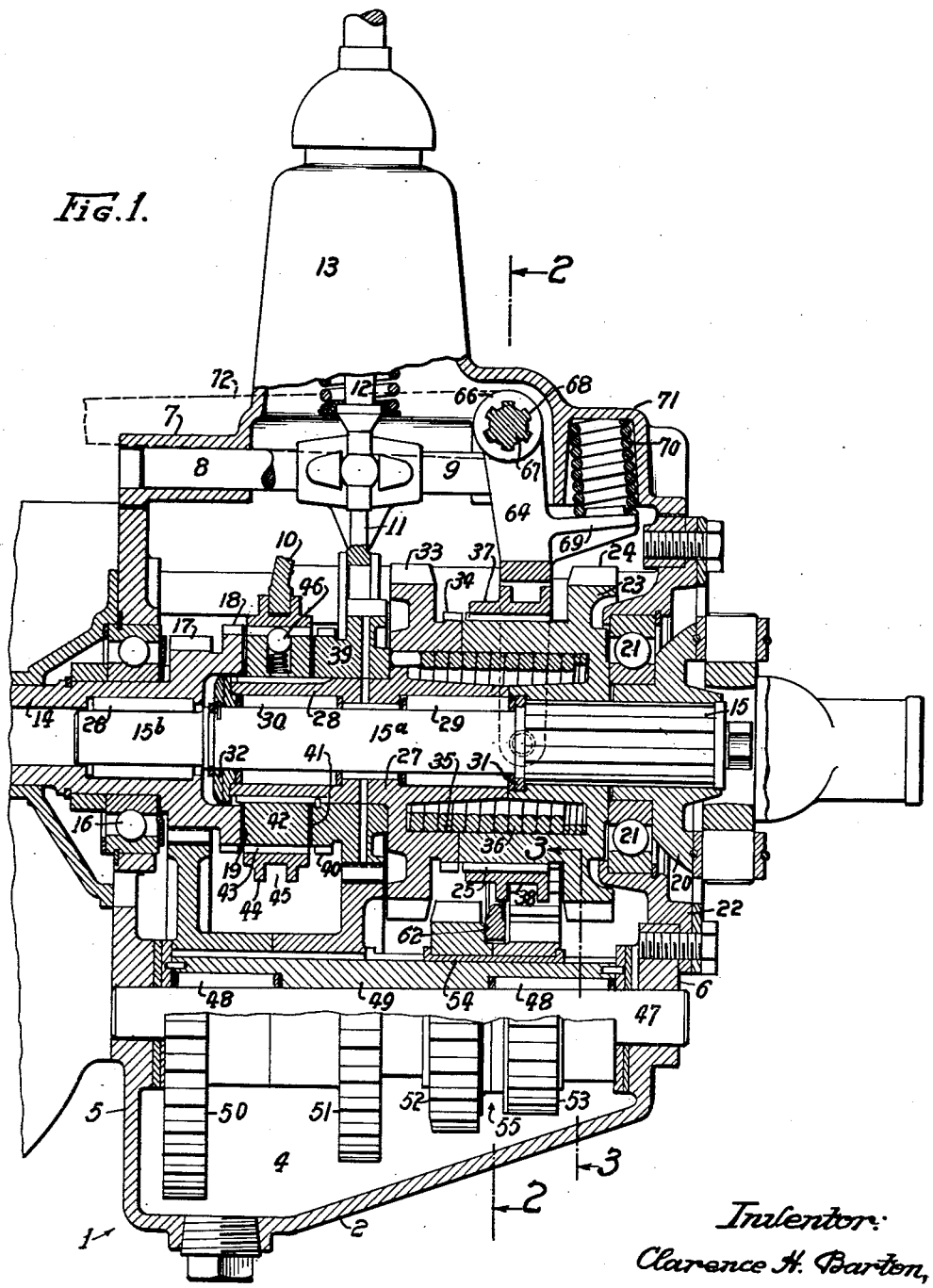
Fig. 1 is a longitudinal vertical sectional view through an automotive transmission embodying my invention.

Referring now in detail to that embodiment of the invention illustrated in the accompanying drawings:—1 indicates the open top casing of the transmission which includes a bottom wall 2, left and right hand side walls 3 and 4 respectively and front and rear end walls 5 and 6 respectively. Associated with the casing and closing the open top thereof is a cover 7 secured to the casing in any suitable manner. In said cover are the longitudinally extending shift rods or rails 8 and 9 respectively, each carrying a yoke 10 and 11 respectively, adapted to be selectively engaged by the bottom end of a shift lever 12. This shift lever has a ball and socket engagement in a hollow cone like housing 13 rising from the cover about midway between its ends. When the shift lever has been manipulated to selectively engage either yoke 10 or 11, the associated rails or rods may be shifted longitudinally in either direction. The shift rod 8 is for the second and high gear or speed for the transmission while the shift rod 9 is for the low and reverse gear of the transmission.

14 indicates the drive shaft of the transmission adapted for connection with the engine, (not shown) in any suitable manner and 15 indicates the coaxially disposed driven shaft. The shaft 14 is journalled near its rear end in a antifriction bearing 16 supported in the front end wall 5 of the casing and just to the rear of said bearing said shaft is formed to provide a gear 17. On the rear end of said shaft are provided spline teeth 18 and the extremity of said end is made as a flat face 19.

The shaft 15 is splined at its rear end and includes unsplined intermediate and front end portions 15a and 15b which are stepped down in diameter as best shown in Fig. 1. On the rear portion of the splined end of the shaft 15 is secured a part 20 of a universal joint by which the shaft is operatively connected to the propeller shaft of the automobile. This universal joint part 20 is journalled in an antifriction bearing 21 carried by a cover plate 22 disposed in an opening provided therefor in the rear wall 6 of the casing. On the front portion of said splined end of the shaft is mounted a cup like clutch member 23 having an external gear 24 at its rear end and external spline teeth 25 at its front end and the purpose of which clutch member will soon appear. The front end portion 15b of the shaft is journalled in an antifriction bearing 26 provided therefor in a recess in the rear end of the drive shaft 14.

27 indicates a second cup like clutch member including a forwardly extending hub 28 and which clutch member and hub are journalled upon antifriction bearings 29 and 30 respectively supported from the intermediate portion 15a of the shaft 15. A thrust collar 31 is interposed between the meeting ends of said clutch members while a thrust bearing collar 32 is carried on the front end of the shaft portion 15a whereby the clutch member 27 is held against endwise shifting. The clutch member 27 is formed near its rear end with external gear teeth 33 and at the front end with spline teeth 34, matching those teeth 25 on the clutch member 23.

The clutch members 23 and 27 are formed at their facing ends with recesses which coact to provide a closed annular pocket 35 in which is located a clutch spring 36. One end of this spring has the usual toe for anchoring in one of said clutch members while the other end of said spring is provided with a more flexible energizing portion operatively engaged with the other of said clutch members. Associated with and longitudinally shiftable on the splined portions 25 and 34 of said clutch members is an internally splined lock-out collar 37 having an external groove 38 to receive the arms of a yoke by which said collar is longitudinally shiftable as will later appear.

When said collar is in its rearmost position, it is disposed only upon the spline teeth of the clutch member 23. Under such conditions, when the clutch member 27 is being driven, it will tend to unwind and radially expand the spring 36 which will act to clutch the two clutch members together so that the clutch member 23 will rotate to drive the shaft 15. However, should the clutch member 23 tend to rotate faster than the clutch member 27, the spring 36 is caused to radially contract and release its gripping action so that the clutch member 23 can overrun the clutch member 27 to produce the free wheeling action in the transmission. When the collar 37 is shifted to its frontmost position, it then engages the spline teeth 34 of the clutch member 27 as well as the like teeth 25 of the clutch member 23 and connects said clutch members together, independent of the clutching action of said spring. When said collar is in the position just described, it is in what is now known as "lock-out" position because the spring is locked-out of action and the two clutch members will rotate as one in either direction.

Rotatively mounted on the hub 28 of the clutch member 27 just forward of the gear 33 is a gear 39 and the front end part of this gear is reduced in diameter and is provided with spline teeth 40 matching the like teeth 18 on the drive shaft 14. The front face of said gear is made flat as at 41. Splined on the front end of the hub 28 of the clutch member 27, and disposed between the face 19 of the shaft 14 and the like face 41 of the gear 39 is a synchronizing member 42 that has external spline teeth 43 to match the like teeth 18 and 40 before mentioned. This member which has flat ends is of such axial length as to normally have a clearance at both of its ends with respect to the faces 19 and 41. Surrounding this member is a collar 44 that is internally splined to engage the teeth of not only the member 42 but also the teeth 18 and 40 before mentioned when said collar is shifted endwise in the proper direction.

The collar 44 has a groove 45 in its periphery to receive the associated end of the yoke 10 on the shift rod 8. The synchronizing member 42 carries a radially extending spring pressed ball 46 which opens through the periphery of the member 42 in a plane between the two adjacent spline teeth and normally engages in a pocket, provided therefor in one of the internal teeth of the collar 44. Thus when the rod 8 is shifted in one direction or the other, the collar through said spring pressed ball will carry the member 42 with it in that direction until it engages with one or the other of the flat faces 19 or 41. This will synchronize the speed of the member 42 with either the shaft 14 or the gear 39 when the spring pressed ball is depressed by the further endwise movement of the collar which can then be brought into engagement with the teeth 18 or 40 according to direction in which said collar is shifted.

47 indicates the countershaft of the transmission disposed parallel with and in a plane below the shafts 14 and 15 respectively. This countershaft is fixed at its ends in the end walls 5 and 6 of the casing and journalled thereon by means of longitudinally spaced sets of antifriction bearings 48 is a countershaft sleeve 49. Fixed to the forward end of this sleeve against endwise movement but so as to rotate with this sleeve, are longitudinally spaced gears 50 and 51 respectively, the former being in constant mesh with the gear 17 on the drive shaft and the latter being in constant mesh with the gear 39 rotative on the hub 28 of the clutch member 27. On the rear end of this sleeve is a pair of gears 52 and 53 respectively which though longitudinally shiftable with respect to said sleeve are rotative therewith. While said gears are made as individual elements, they are longitudinally shiftable as a unit upon said sleeve and in this respect said gears are held against endwise displacement by a spline 54 disposed in a groove in said sleeve, the ends of said spline being turned up into engagement with the ends of said gears. The meeting end of the hub of said gears provides an annular groove 55 for the purpose soon to appear.

56 indicates an idler shaft disposed in a plane slightly above that of the countershaft and preferably to the right hand side thereof. This shaft is fixed at its rear end in the rear wall 6 of the casing and is fixed at its front end in a web 57 made integral with a part of the right hand side wall 4 and the bottom wall 2 of the casing. Longitudinally shiftable as well as rotatably mounted on said idler shaft is an idler gear 58 provided with an annular groove 59 disposed in the transverse plane of the groove 55 as provided between the gears 52—53. Said gear 58 is in constant mesh with the gear 53 on the countershaft sleeve 49.

Figure 2:
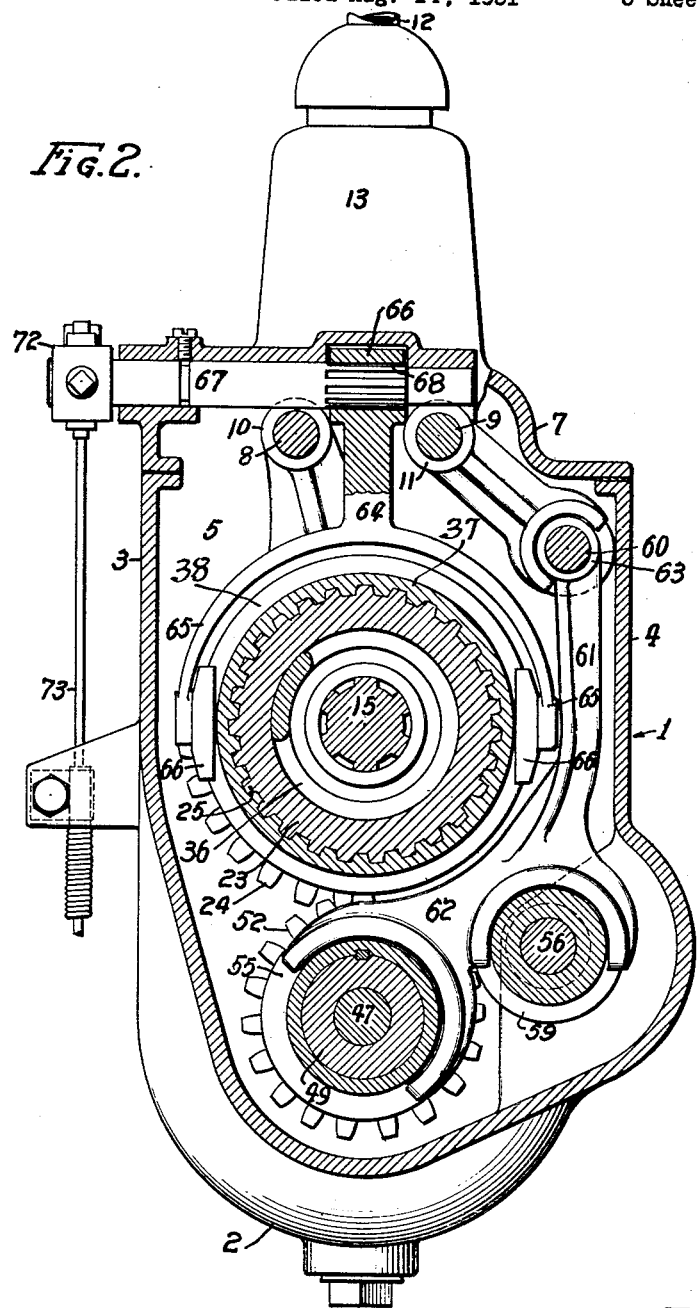
Fig. 2 is a transverse vertical sectional view through the same as taken on the line 2—2 of Fig. 1.

A yoke supporting rail in the form of a longitudinally extending shaft 60 is fixed at its ends in the front and rear end walls of the casing near the right hand side wall and open top of the casing as best shown in Fig. 2. Associated with said shaft 60 is a yoke arm 61 that extends down alongside the right hand side wall 4 of the casing to terminate at its bottom in an inwardly extending duplex yoke 62 that operatively engages in the groove 59 of the gear 58 as well as in the groove 55 as provided by the gears 52—53 as before explained. At the top end of the yoke arm is a sleeve 63 that is slidable or shiftable on the shaft 60 and this sleeve is provided with an annular groove in which is engaged the bifurcated end of the yoke 11 associated with the rail 9.

When the shift lever 12 is manipulated to select the yoke 11 for operative engagement and is then actuated to swing its bottom end forwardly, it is apparent the yoke 11 moves forwardly. By reason of the engagement of said yoke with the sleeve 63 of the yoke arm 61, said yoke arm is also moved forwardly and this will move the gears 52—53 on the countershaft and the idler gear 58 on the shaft 56 in a similar manner. In this forward movement of said gears, the gear 52 moves into mesh with the gear 33 on the clutch member 27 and provides first speed forward. In the rear movement of said gears the idler gear 58 moves into engagement with the gear 24 of the clutch member 23 to provide the reverse gear therefor.

The operation of the transmission structure above described is as follows:—

When the shaft 14 is being engine driven, it is apparent that the gears on the countershaft sleeve are likewise being driven and so is the gear 39. As shown in Fig. 1, the parts of the transmission are in neutral and upon manipulation of the lever to provide first speed forward the gear 52 is brought into engagement with the gear 33 of the clutch member 27 so that the drive is from the shaft 14 through the gear 17 and 50 to the sleeve 49 and from the sleeve through the gear 52 to the clutch member 27. With said clutch member so driven the spring 36 is caused to radially expand and clutch the two members 23 and 27 together. As the clutch member 23 is disposed on the splined end of the shaft 15 it is apparent that the same is driven to drive the propeller shaft through the universal joint 20. Should the clutch member 23 be driven by the shaft 15 at a speed greater than that of the clutch member 27, then said spring is radially contracted and releases its clutching engagement with the clutch members so that the clutch member 23 overruns the clutch member 27 with a free wheeling action.

Upon manipulation of the lever 12 to provide reverse the gears 52—53 and 58 are moved rearwardly as a unit, first into and through neutral position after which the idler gear 56 is moved into engagement with the gear 24 of the clutch member 23 so that said gear is driven in a reverse direction and of course, said shaft 15 and will be driven in said reverse position. In this respect it is pointed out that the clutch spring is inoperative so that a positive driving connection is had between the shaft 14 and the shaft 15 without any action upon the part of the clutch spring.

With the parts again in neutral, and it is desired to go into third speed forward, the lever 12 is manipulated to provide first speed forward as just above described. The lever is then actuated in the conventional manner, to drop the yoke 11 and operatively select and engage the yoke 10 on the shift rod 8. After selectively engaging said yoke and the top end of the lever is swung forward, its bottom end will shift the yoke 10 rearwardly. By reason of the engagement of the yoke with the collar 44, said collar through the spring pressed ball 46 will carry the synchronizing member 42 rearwardly with it until the rear face of said member engages with the front flat face 41 of the gear 39. This will cause the said member to rotate with said gear and after which in the final part of this shift, the collar 44 depresses said spring pressed ball and moves into engagement with the spline teeth 40 of said gear. The drive is then from the shaft 14 through the gears 17 and 50 to the sleeve 49 and then through the gears 51 and 39 to the collar 44 and member 42. As the said member 42 has a splined engagement on the front end of the hub 28 of the clutch member said member operates to drive the shaft 15 through the clutch spring 36 and clutch member 23 as before described.

When going into high, of course, the top end of the lever 12 is swung rearwardly and this will shift the yoke 10 forwardly, when the collar 44 will leave the teeth 40 of the gear 39 and will through the spring pressed ball 46, pick up the synchronizing member 42 and move it forwardly through neutral and then into engagement with the flat face 19 on the rear end of the shaft 11. When thus engaged, the member 42 will be driven by the shaft 14 and in the final part of the movement of the collar, the ball 46 is depressed and the collar 44 engages the teeth 18 of the shaft 14. The drive is then from the shaft 14, through the collar 44 to the synchronizing member 42 to the hub 28 of the clutch member 27. With the clutch member thus driven, the spring 36 is energized to clutch the said clutch member to the clutch member 23 and through the same to the shaft 15.

In each instance, so far as first, second and third speeds forward are concerned, it is possible for the clutch member 23 to overrun the clutch member 27. This overrunning occurs, either when descending a grade or the engine is decelerated at which time the automobile free wheels under momentum.

It is of course, apparent, that under certain conditions, in any one of the forward speeds, it may be desired to lock-out this free wheeling action so that a drive such as in a conventional non-free wheeling transmission is available. Such a lock-out action may be attained by shifting the collar 37 forward to operatively and positively connect the two clutch members together.

To impart such shifting movement to the collar 37, a yoke 64 is provided that includes arms 65 at the bottom that carry pads 66 engaged in the groove 38 of said collar 37. On the top end of said yoke is a sleeve 66 that is mounted on a transverse rock shaft 67 journalled in the side walls of the cover 7. That part of said shaft in the longitudinal median plane of the casing is externally splined and the yoke sleeve is internally splined as at 68 for an operative engagement therewith.

Means is provided which normally act to swing the yoke in a clockwise direction toward and into a position wherein the collar 37 is bridging the abutting ends of the clutch members 23 and 27. Such a means includes a rearwardly extending lip 69 on the yoke between its arms and sleeve and associated with said lip is a spring 70 disposed in a hollow boss 71 provided therefor in the rear end of the cover 7.

One end of the shaft 67 (preferably the left hand end) without the cover has secured thereto a forwardly extending lever 72 and which lever may be actuated from a point convenient for the driver by means of a Bowden wire and tube 73 attached to the front end of the lever.

When said lever is swung downwardly it will through the splined connection 68 before mentioned, act to swing the lever counterclockwise (as shown in Fig. 1) against the action of the spring 70 and will shift the collar 37 out of engagement with the spline teeth 34 of the clutch member 37. When said collar is in this position, free wheeling is possible in all speeds forward. When it is desired to lock-out free wheeling action, the lever 72 is released from the holding action as provided by the Bowden wire and tube and the spring 70 then swings the yoke clockwise. This again shifts the collar 37 forwardly into a position bridging and connecting the abutting ends of the clutch members 23 and 27 together and locks out said free wheeling action.

With the above described construction it is possible to provide a transmission having a number of forward speeds and reverse and wherein free wheeling may be had in all of such forward speeds and this without effecting reverse or requiring any further manipulation on the part of the driver in going into and out of reverse, whether the transmission is being used as a free wheeling one or a conventional non-free wheeling one.

Such a construction is of especial advantage to novice drivers, as there is no necessity when free wheeling, to manipulate some other device when going out of reverse to restore free wheeling.

While in describing the invention, I have referred in detail to the form, arrangement and construction of the various parts thereof, the same is to be considered merely as illustrative, so that I do not wish to be limited thereto except as may be specifically set forth in the appended claims.

I claim as my invention:—

1. In an automotive transmission, a driven shaft and a clucth member thereon, a second clutch member, means acting in a relative rotation between said clutch members in one direction for operatively clutching them together, and longitudinally shiftable gearing including oppositely rotating gears, said gearing operating when shifted in one direction to drive the clutch member on the driven shaft and operating when shifted in the other direction to drive said second clutch member.

2. In an automotive transmission, a driven shaft and a clutch member thereon, a second clutch member, means acting in a relative rotation between said clutch members in one direction for operatively clutching them together, longitudinally shiftable gearing including oppositely rotating gears, said gearing operating when shifted in one direction to drive the clutch member on the driven shaft and operating when shifted in the other direction to drive said second clutch member and means operable when said second clutch member is being so driven to connect the same to the clutch member on the driven shaft independent of said means acting in a relative movement between said clutch members in one direction.

3. In an automotive transmission, a driven shaft, a clutch member thereon, a second clutch member, means acting in a relative rotation between said clutch members in one direction for operatively clutching them together, a countershaft, and a third shaft and gearing shiftable as a unit on said countershaft and third shaft and including oppositely rotating gears, said gearing when shifted in one direction on said last mentioned shafts operating to drive the clutch member on the drive shaft and operating when shifted in the other direction to drive said second clutch member.

4. In an automotive transmission, a driven shaft, a clutch member thereon, a second clutching member, means acting in a relative rotation between said clutch members in one direction for operatively clutching them together, a countershaft, and a third shaft, gearing shiftable as a unit on said countershaft and third shaft and including oppositely rotating gears, said gearing when shifted in one direction on said last mentioned shaft operating to drive the clutch member on the driven shaft and operating when shifted in the other direction to drive said second clutch member and means shiftable longitudinally of said clutch members for connecting them together independent of said means acting in a relative movement between said clutch members in one direction.

5. In an automotive transmission, a drive shaft, a driven shaft and a countershaft, gearing providing second and third speeds forward, gearing providing first speed forward and reverse, said last mentioned gearing including oppositely rotating gears constantly driven from the countershaft and longitudinally shiftable with respect thereto and other gears coacting to provide associated clutch members, a shiftable yoke associated with the gearing providing second and third speed forward, a second shiftable yoke operative to shift said oppositely and constantly rotating gears longitudinally with respect to the countershaft to provide said first speed forward and reverse, an overrunning clutch spring disposed between said other gears of said gearing providing first speed forward and reverse, and a shift lever operative to select either yoke for imparting movement thereto and means for locking said clutch out of operation.

6. In an automotive transmission, a drive shaft, a driven shaft and an intermediate shaft, coacting gear like clutch members on said driven and intermediate shaft, means operative in the relative rotation of said clutch members in one direction for clutching them together, a gear loose on said intermediate shaft, nonshiftable gears on the countershaft for driving the gear loose on the intermediate shaft, shiftable means for connecting the intermediate shaft to the drive shaft either directly or through the gear loose on said intermediate shaft, gearing including oppositely rotating gears driven from but shiftable longitudinally of the countershaft for engagement with either gear like clutch member on said driven and intermediate shafts and means for connecting said gear like clutch members together independent of said means operating in a relative rotation of said clutch members for clutching them together in a relative rotation between them in one direction.

7. In an automotive transmission, a drive shaft, a cup like clutch member fixed thereto, a second cup like clutch member associated with the first mentioned one and coacting therewith to provide a pocket for a clutch spring, a gear on the opposite end of each clutch member and spline teeth on the abutting ends of said clutch members, a countershaft, gearing including oppositely rotating gears driven by and longitudinally shiftable with respect to the countershaft, means for shifting said gearing into engagement with the gear on either clutch member to drive said clutch members in opposite directions and means shiftable on the spline teeth of said clutch members, between the gears thereon for connecting them together independent of said spring.

8. In a transmission a driven shaft, longitudinally spaced gears thereon to provide coacting clutch members, an overrunning clutch means arranged between said gears for connecting them together in a relative rotation in one direction, gearing associated with said longitudinally spaced gears and operable when shifted in one direction to mesh with one of said gears to provide a reverse drive for said shaft and operable when shifted in the other direction to mesh with the other of said gears to provide a forward drive for said shaft through said clutch.

9. In a transmission, a driven shaft, a driving member thereon including a gear, a second gear fixed with respect to said shaft, an overrunning clutch between said gears for operatively connecting them together in a relative rotation in one direction, and gearing associated with said gears and operable when shifted in one direction to drive said shaft in reverse through one of said gears.

10. In a transmission, a driven shaft, a driving member thereon including a gear, a second gear fixed with respect to said shaft, an overrunning clutch between said gears for operatively connecting them together in a relative rotation in one direction, and gearing associated with said gears and operable when shifted in one direction to drive said shaft in reverse through one of said gears, said gearing when shifted in the other direction being operable through the other of said gears to provide a forward drive for said shaft.

11. In a transmission, a driven shaft, a driving member, an overrunning clutch between said shaft and member comprising coacting clutch elements each of which carries a gear, and gearing associated with said shaft and member and operable when shifted in one direction to engage the gear carried by one of the clutch elements to provide a reverse drive for said shaft and operable when shifted in the other direction to engage the gear carried by the other clutch element to provide a forward drive for said shaft.

12. In a transmission, a driven shaft, a driving member, an overrunning clutch between said shaft and member comprising a pair of clutch elements each carrying a gear and means associated with said elements and operating in a relative rotation between said elements in one direction to clutch them together, gearing associated with said shaft and members and operable when shifted in one direction to engage the gear carried by one of the clutch elements to provide a reverse drive for said shaft independent of said clutch, said gearing being operable when shifted in the other direction to engage the gear carried by the other clutch member to drive said shaft forward through said clutch, and means associated with said clutch elements operable to lock said clutch elements together independent of said clutch means.

13. In a transmission, a driven shaft, a driving member, an overrunning clutch between said shafts and member and comprising a geared element fixed to said shaft and a second geared element carried by said driving member, means associated with said elements for clutching them together when said elements rotate relatively in one direction, and gearing associated with said shaft and driving member and shiftable in one direction to engage the geared element fixed to the driven shaft to provide a reverse drive therefor independent of said clutch and shiftable in the other direction to engage the second geared element carried by the driving member to provide a forward drive for the said shaft through said overrunning clutch.

14. In a transmission, a driven shaft, a driving member, an overrunning clutch between said shaft and member and comprising a geared element fixed to said shaft and a second geared element carried by said driving member and gearing shiftable in one direction to engage the geared element fixed to said shaft to provide a reverse drive therefor independent of said clutch, said gearing when shifted in the other direction engaging the geared element on the driving member to provide a forward drive for said shaft through said clutch and means operable for locking-out said clutch when providing a forward drive for said shaft.

CLARENCE H. BARTON.